United States Patent [19]

Malen et al.

[11] 3,728,383
[45] Apr. 17, 1973

[54] α(M-ALKOXYPHENOXY) AND α(M-TRIFLUORO-METHYLPHENOXY) M-TOLUIC ACIDS

[75] Inventors: Charles Malen, Fresnes; Bernard Danrée, St. Germain en Laye; Pierre Desnoyers, Fontenay aux Roses, all of France

[73] Assignee: Societe en nom Collectiv "Science Union èt Cie," Societe Francaise de Recherche Medicale, Suresnes, France

[22] Filed: Dec. 29, 1969

[21] Appl. No.: 888,941

[30] Foreign Application Priority Data

Jan. 6, 1969 Great Britain..........................726/69

[52] U.S. Cl.................260/520, 260/516, 260/518 A, 260/519, 424/317, 424/319
[51] Int. Cl..............................................C07c 65/00
[58] Field of Search......................................260/520

[56] References Cited

OTHER PUBLICATIONS

Exner Chem. Abst. 61 4192 d (1962)
Boehringer et al., Ibid 60 10659

*Primary Examiner*—Henry R. Jiles
*Assistant Examiner*—John F. Terapane
*Attorney*—Cifelli, Behr and Rhodes

[57] ABSTRACT

Meta-toluic acid α-substituted by the radical of the formula

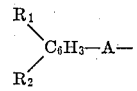

wherein:
   A is oxygen, sulfur, imino- or lower-alkylimino, and
   $R_1$ and $R_2$ are hydrogen, halogen, lower alkoxy or trifluoromethyl, provided that $R_1$ and $R_2$ are not simultaneously hydrogen, when A is oxygen.

These compounds possess thrombolytic, fibrinolytic, vascular brittleness inhibiting and immunodepressant activities.

3 Claims, No Drawings

α(M-ALKOXYPHENOXY) AND α(M-TRIFLUORO-METHYLPHENOXY) M-TOLUIC ACIDS

The present invention provides meta-toluic acid compounds of the general formula I:

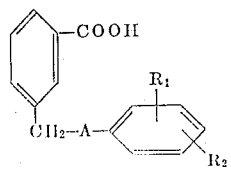
(I)

wherein:
A is selected from the group consisting of an oxygen atom, a sulfur atom and an imino radical of the formula —NH— or —NR— wherein R represents a lower alkyl radical containing from one to five carbon atoms inclusive, and $R_1$ and $R_2$ are the same or different and each is selected from the group consisting of a hydrogen atom, a halogen atom, a lower alkoxy radical containing from one to five carbon atoms inclusive, and a trifluoromethyl radical, provided that $R_1$ and $R_2$ are not simultaneously a hydrogen atom, when A is an oxygen atom.

The compounds of the general formula I are new and may be prepared by reacting an α-halo-meta-toluic acid or one of its esters of the general formula II:

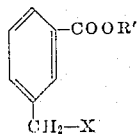
(II)

in which
X represents a halogen atom and
R' represents a hydrogen atom, a lower alkyl radical or an aralkyl radical wherein the alkyl parts preferably contain from one to five carbon atoms inclusive, with a compound of the general formula III:

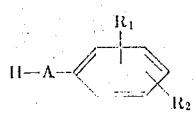
(III)

wherein A, $R_1$ and $R_2$ have the meanings given above.

The reaction may be carried out in a suitable solvent, such, for example, as an aliphatic alcohol, an ether, a ketone, a hydrocarbon, an aliphatic nitrile or the nitromethane, at a temperature within the range of from 20° to 150°C, in the presence of an acceptor for the hydrohalic acid formed during the reaction. This acceptor may be an alkali or alkaline earth metal salt of carbonic acid such, for example, as sodium or potassium carbonate, or in the case where A represents —NH— or —NR—, an excess of the compound of the general formula III.

The compounds of the general formula I may be converted into addition salts with mineral or organic bases such, for example, as alkaline or alkaline earth metals hydroxides, primary, secondary and tertiary amines, such as mono- di- and triethylamines, and heterocyclic bases such, for example, as piperazine, piperidine, morpholine, etc. These salts are also included in the present invention.

The following examples illustrate the invention. Melting points are determined on a Kofler bank.

EXAMPLE 1

α-phenylthio-meta-toluic acid

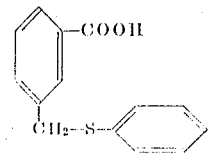

2.52 g of thiophenol was added to a suspension of 9.50 g of anhydrous potassium carbonate in 150 ml of anhydrous acetone. The stirring was maintained for 10 minutes, then the reaction mixture was refluxed, and a solution of 5 g of α-bromo-meta-toluic acid in 50 ml of anhydrous acetone was dropped while stirring vigorously. The reflux was maintained for 3 hours, then the inorganic precipitate was filtered off and washed with acetone. The acetonic filtrates were evaporated. The residue taken up with water was acidified with hydrochloric acid.

The precipitate of α-phenylthio-meta-toluic acid was suctioned off, washed with water and dried. 4.7 g of crude α-phenylthio-metatoluic acid were obtained (yield : 84 percent). After recrystallization from 75 ml of cyclohexane, 4 g of α-phenylthio-meta-toluic acid were obtained. Melting Point 100°–101°C.

EXAMPLE 2

α-(para-anisidino) meta-toluic acid

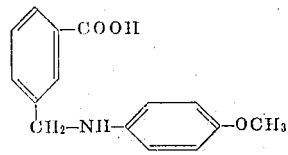

5 g (0.023 mole) of α-bromo-meta-toluic acid were added gradually to a solution of 5.66 g (0.046 mole) of para-anisidine in 80 ml of ether, while refluxing. The reflux was maintained for 9 hours.

The anisidine hydrobomide was suctioned off and washed with ether. The ethereal phases were extracted with a sodium hydroxide solution.

The alkaline phases were acidified, until pH 4-5, with a solution of hydrochloric acid. 4.2 g of crude product, melting at 120°–125°C, were obtained. After recrystallization from 20 ml of benzene, 3.4 g of α-(para-anisidino) meta-toluic acid were obtained. Melting Point 125°–126°C.

EXAMPLE 3

α-(meta-methoxyphenyloxy) meta-toluic acid

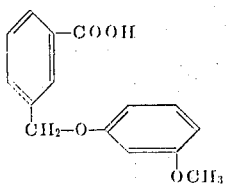

A solution of 40 g (0.174 mole) of methyl α-bromo-meta-toluate in 100 ml of anhydrous acetone was added, while stirring, and under nitrogen atmosphere to a suspension of 21.3 g (0.174 mole) of metamethoxyphenol and 71 g of potassium carbonate in 200 ml of anhydrous acetone.

The reaction mixture was refluxed for 3 hours, then acetone was evaporated, and the residue was taken up with water. The oily residue formed was extracted with ether. The ethereal phases washed with water, were dried and evaporated. The residue was distilled and 39 g of methyl α-(meta-methoxyphenyloxy) meta-toluate were obtained. Boiling point (0.01 mm Hg) = 155°–160°C $n_{22}^D$: 1.5742.

The ester so obtained was saponified, under reflux, with 100 ml of a 10 percent solution of hydro-alcoholic potassium hydroxide, for 1½ hours. The alcohol was evaporated and the residue taken up with water. The aqueous phase was extracted with ether then acidified. The crude α-(meta-methoxyphenyloxy) meta-toluic acid was extracted with ether. The organic solution was evaporated, and 42 g of product were obtained. This product recrystallized from 140 ml of aqueous ethanol gave 32.1 g of α-(meta-methoxyphenyloxy) meta-toluic acid, metling at 92°–93°C.

EXAMPLE 4

α-(para-fluoroanilino) meta-toluic acid

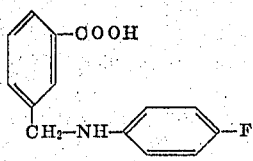

10 g of methyl α-bromo-meta-toluate in 30 ml of anhydrous ether were added, while refluxing and stirring, to a solution of 20.4 g of redistilled para-fluoroaniline in 50 ml of anhydrous ether. After refluxing for 8 hours, the precipitate of fluoroaniline hydrobromide was suctioned off. The ethereal phase was evaporated and the residue was treated with diluted hydrochloric acid. The methyl α-(para-fluoroanilino) meta-toluate hydrochloride so obtained was saponified with a slight excess of a 10 percent solution of hydro-alcoholic potassium hydroxide, and according to the method given in Example 3, 6.5 g of α-(para-fluoroanilino) meta-toluic acid were obtained. Melting Point 140°–145°C.

EXAMPLE 5

α-(para-chloro-N-methylanilino) meta-toluic acid

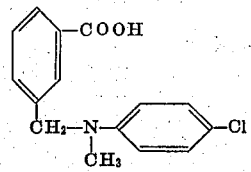

15 g of methyl α-bromo-meta-toluate in 40 ml of xylene were added, while stirring, to a solution of 18.4 g of para-chloro-N-methylaniline in 50 ml of boiling xylene. The reaction mixture was refluxed for 2 hours. The precipitate of para-chloro-N-methylaniline hydrobromide was suctioned off and xylenic solution was evaporated under vacuum. The crude methyl α-(para-chloro-N-methylanilino) meta-toluate residue was saponified with a 10 percent solution of hydro-alcoholic potassium hydroxide.

After refluxing for 2 hours, the corresponding acid was obtained, according to the method previously described. After recrystallization in a mixture of 100 ml of benzene and 35 ml of cyclohexane, 9.5 g of α-(parachloro-N-methylanilino) meta-toluic acid were obtained. Melting Point 154°–155°C.

EXAMPLES 6 – 11

The following compounds were prepared according to the method described in the previous examples:

6. α-(para-chlorophenylthio) meta-toluic acid,

Melting Point 126°–128°C (cyclohexane), starting from α-bromo-meta-toluic acid and para-chlorothiophenol.

7. α-(para-chloroanilino) meta-toluic acid,

Melting Point 154°–156°C (ethanol/water), starting from α-bromo-meta-toluic acid and para-chloroaniline.

8. α-(para-chlorophenyloxy) meta-toluic acid,

Melting Point 134°–136°C (benzene), starting from α-bromo-meta-toluic acid and para-chlorophenol.

9. α-(meta-trifluoromethylphenyloxy) meta-toluic acid,

Melting Point 118°–119°C (ethanol/water), starting from α-bromo-meta-toluic acid and meta-trifluoromethylphenol.

10. α-(ortho-chlorophenyloxy) meta-toluic acid,

Melting Point 145°–147°C (cyclohexane/benzene), starting from α-bromo-meta-toluic acid and ortho-chlorophenol.

11. α-(2,6-dichlorophenyloxy) meta-toluic acid,

Melting Point 227°–228°C, with sublimation (ethanol), starting from α-bromo-meta-toluic acid and 2,6-dichlorophenol.

The new compounds of the present invention and their physiologically tolerable addition salts possess valuable pharmacological and therapeutic properties especially thrombolytic, fibrinolytic, vascular brittleness inhibiting and immunodepressant activities.

Their toxicity is low and the $LD_{50}$ varies from 250 to 875 mg/kg by intraperitoneal route and from 500 to >1,000 mg/kg by the oral route in mice.

The thrombolytic activity was studied in vitro by the method of von Kaulla (Thromb. Diath. Haem. 5 489 (1961)) on the standard blood clot. It was observed that they provoke the lysis of the clot at 0.008 to 0.04 molar concentrations, corresponding to concentrations between 1.95 and 12.85 mg/ml.

A similar effect may be observed in vivo by the method of S. Wessler (J. Clin. Invest. 34 647 (1955)). The new compounds inhibit totally or partially the thrombosis in the vena jugularis of rabbits, provoqued by injection of a heterologous serum at the dose of 50 mg/kg I.V. This effect is due to both the fibrinolytic and immunodepressant properties of the new products.

When administered orally at doses of 50 to 100 mg/kg in rat, the new compounds decrease from 21 to 33 percent the euglobulin lysis time 30 to 90 minutes after the administration (von Kaulla : Am. J. Clin. Path. 29 104 (1958)).

The new compounds decrease also the capillary permeability. By the test of Ambrose and Eds (J. Pharm. Exp. Therap. 90 359 (1947)), it was observed that they delay from 70 to 190 percent the appearance of the blue coloration on the depilated abdomen skin of the rabbit after injection of 2 cm³ of trypan blue at 1 percent, when administered intraperitoneally at doses of 50 to 300 mg/kg.

The new compounds can be used in therapy, especially in the treatment and the prevention of blood hypercoagulability, thromboembolic diseases, vascular brittleness and as immunodepressant.

The invention also provides pharmaceutical compositions containing compounds of the general formula I or physiologically tolerable salts thereof in admixture or conjunction with suitable pharmaceutical carriers, such as, for example, distilled water, glucose, lactose, starch, talc, magnesium stearate, cocoa butter. These pharmaceutical compositions may be in form of tablets, dragees, capsules, suppositories or solutions, in order to be administered by oral, rectal or parenteral route at the doses of 10 to 500 mg 1 to 5 times a day.

We claim :

1. A compound selected from the group consisting of:
    a. meta-toluic acid compounds of the formula I

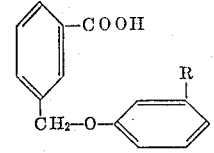

wherein:
       R is selected from the group consisting of lower alkoxy containing from one to five carbon atoms inclusive and trifluoromethyl, and
    b. physiologically acceptable basic addition salts thereof.

2. A compound of claim 1 which is α-(meta-methoxyphenyloxy) meta-toluic acid.

3. A compound of claim 1 which is α-(meta-trifluoromethylphenyloxy) meta-toluic acid.

* * * * *